United States Patent Office.

HAYDN M. BAKER, OF WASHINGTON, DISTRICT OF COLUMBIA.

Letters Patent No. 101,969, dated April 19, 1870.

IMPROVEMENT IN THE MANUFACTURE OF STEEL FROM CAST OR PIG-IRON.

The Schedule referred to in these Letters Patent and making part of the same

To all whom it may concern:

Be it known that I, HAYDN M. BAKER, of the city of Washington and District of Columbia, have invented a new and useful Process for the Manufacture of Steel from Cast or Pig-Iron; and that the following is a full and exact description thereof.

The nature of my invention consists in the application of the products of the decomposition of nitric acid by elevated temperatures, or of nitric acid itself, to cast or crude pig-iron in a reverberatory furnace, while the said cast or crude pig-iron is at a very elevated temperature, the said temperature being that approaching the melting point, when the aforesaid crude or cast-iron is in a spongy or porous condition, or the process of fusion itself, or any elevated temperature above that point.

For the more perfect guidance of others interested in the manufacture of steel, I will state that I deem it the most appropriate time to apply the vapors of nitric acid, or the products of the decomposition of the same, just as the cast or crude iron is entering into a state of fusion.

To enable me to apply the aforesaid vapors at any time I may elect, I have a chamber made in the wind-wall of the furnace, the entrance to which is from the outside of said furnace, being provided with a movable tile of clay, to afford access when desired, and to close the furnace to retain the heat.

There are conduits leading from this chamber to the bed of the furnace, for the purpose of conducting the vapors of nitric acid and the products of its decomposition to the furnace, and into contact with the melting metal.

I will now describe the working of a batch. I employ a reverberatory furnace, first bringing it to an elevated temperature. I then throw a quantity of silicic acid into the chamber of the wind-wall, and close the said chamber. I then throw or charge in the cast or crude pig-iron to be treated upon the bed of the furnace, and close the charging-door. I now force the fires, and strive to increase the temperature, and carefully keep watch of the metal through the "eye-hole" in the charging-door, and examine it from time to time with an iron rod, and when it becomes soft and spongy, so that the end of the rod may be passed into the mass, I throw the necessary quantity of nitrate of soda, or any other nitrate, in upon the silicic acid or sand in the chamber of the wind-wall, and quickly close the said chamber from the outside. The sand, being very hot, yields a portion of its temperature to the nitrate of soda, which immediately enters into decomposition, yielding free oxygen, free nitrogen, nitric oxide, nitrous, hypernitric, and nitric acids, which flow through the conduits to the bed of the furnace, and, coming in contact with the melting metal, surrender their oxygen to the carbon contained in said metal, forming carbonic oxide and carbonic acid, which pass off through the stock or stack.

The nitrogen plays, also, an important part, and from my later experiments I am convinced that it is one of the component elements of steel.

The decomposition of the nitrate of soda leaves oxide and peroxide of sodium in the chamber, in contact with silicic acid, (sand,) these compounds, entering into combination, producing silicate of soda or silicate of the base previously combined with the nitric acid.

A portion of the metal will be melted and another portion assume an agglutinated property. The melted and unmelted portions are now to be "puddled" together into balls or masses, and removed from the furnace, and conveyed to the "squeezers," or placed under a trip-hammer, and made into a homogeneous mass, and will then be found to consist of an extra quality of steel, provided that the right quantity of nitrate of soda has been used and the process managed with a moderate degree of skill.

The silicate of soda is now to be removed from the chamber, in order to receive a fresh charge of silica, &c.

The advantages of this invention are, that it affords a rapid, economical, and certain method of transforming cast or crude pig-iron into steel of superior quality, without injury to furnaces or apparatus used for the purpose.

Claims.

What I claim as my invention, and desire to secure by Letters Patent, is—

1. The process herein described for the production of nitric acid and the products of its decomposition, for the purpose of transforming the high carbides of iron into steel.

2. The application and use of nitric acid and the products of its decomposition to cast or crude pig-iron, at elevated temperatures, in the manner herein described and fully set forth, for the purpose of manufacturing steel.

HAYDN M. BAKER.

Witnesses:
   EDM. F. BROWN,
   R. L. ROSS.